United States Patent [19]
Maru et al.

[11] Patent Number: 5,877,784
[45] Date of Patent: Mar. 2, 1999

[54] PRINTHEAD, PRINTING APPARATUS AND PRINTING METHOD USING PRINTHEAD

[75] Inventors: Hiroyuki Maru, Atsugi; Junji Shimoda, Chigasaki; Fumio Murooka, Atsugi; Tatsuo Furukawa, Isehara; Hiroyuki Ishinaga, Tokyo; Masaaki Izumida, Kawasaki; Yoshinori Misumi, Tokyo, all of Japan

[73] Assignee: Canon Kabushiki Kaisha, Tokyo, Japan

[21] Appl. No.: 497,446

[22] Filed: Jun. 30, 1995

[30] Foreign Application Priority Data

Jun. 30, 1994 [JP] Japan .................................. 6-149426

[51] Int. Cl.⁶ ....................................................... B41J 2/01
[52] U.S. Cl. ............................................. 347/12; 347/180
[58] Field of Search ................................... 347/9, 12, 13, 347/180, 181, 182

[56] References Cited

U.S. PATENT DOCUMENTS

| | | |
|---|---|---|
| 4,313,124 | 1/1982 | Hara . |
| 4,345,262 | 8/1982 | Shirato et al. . |
| 4,459,600 | 7/1984 | Sato et al. . |
| 4,463,359 | 7/1984 | Ayata et al. . |
| 4,558,333 | 12/1985 | Sugitani et al. . |
| 4,608,577 | 8/1986 | Hori . |
| 4,723,129 | 2/1988 | Endo et al. . |
| 4,740,796 | 4/1988 | Endo et al. . |
| 5,281,980 | 1/1994 | Kishida et al. ............................ 347/13 |
| 5,357,268 | 10/1994 | Kishida et al. ............................ 347/13 |
| 5,477,245 | 12/1995 | Fuse . |

FOREIGN PATENT DOCUMENTS

| | | |
|---|---|---|
| 0390202 | 10/1990 | European Pat. Off. . |
| 54056847 | 5/1979 | Japan . |
| 59123670 | 7/1984 | Japan . |
| 59138461 | 8/1984 | Japan . |
| 60071260 | 4/1985 | Japan . |
| 2-089658 | 3/1990 | Japan . |
| 5-050636 | 3/1993 | Japan . |
| 5-229111 | 9/1993 | Japan . |
| 6-071875 | 3/1994 | Japan . |
| 6-122223 | 5/1994 | Japan . |

Primary Examiner—N. Le
Assistant Examiner—Craig A. Hallacher
Attorney, Agent, or Firm—Fitzpatrick, Cella, Harper & Scinto

[57] ABSTRACT

A downsized, low-cost, high-density printhead, a printing apparatus and a printing method using the printhead can be achieved. If the number of electrothermal transducers is N, a shift register is capable of storing print information corresponding to N/8 electrothermal transducers. First, print information corresponding to the capacity of the shift register is transferred to the printhead. Then, the shifting function of the shift register is stopped to hold the print information. A 3-bit selection signal is inputted from an input terminal as the print information information. The selection signal is sent to a time-divisional logical circuit, then N/8 electrothermal transducers are selected, and a printing operation based on the input data is performed. This operation is repeated eight times, to complete printing by all the N electrothermal transducers.

28 Claims, 13 Drawing Sheets

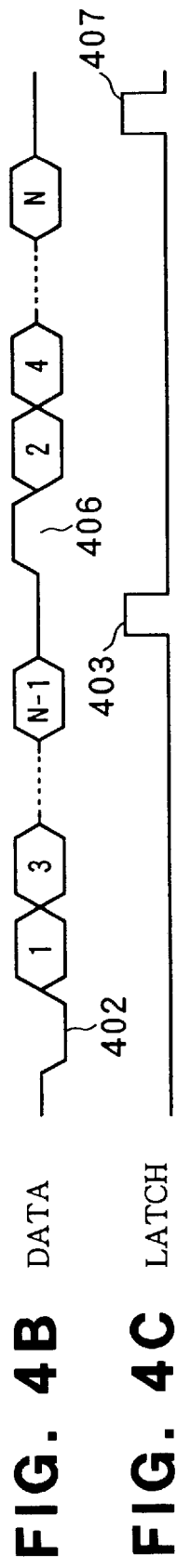
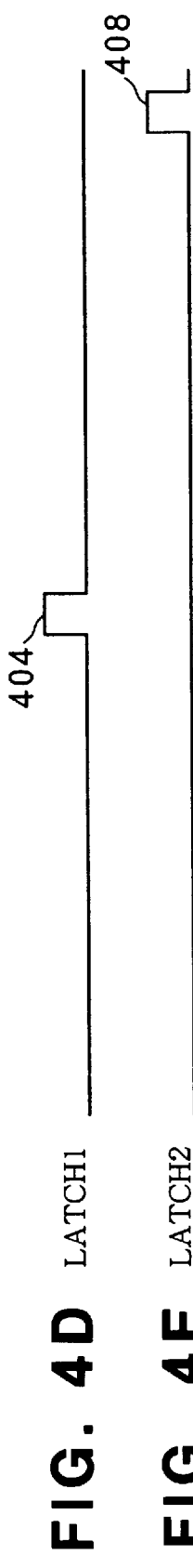
FIG. 4A CLK
FIG. 4B DATA
FIG. 4C LATCH
FIG. 4D LATCH1
FIG. 4E LATCH2

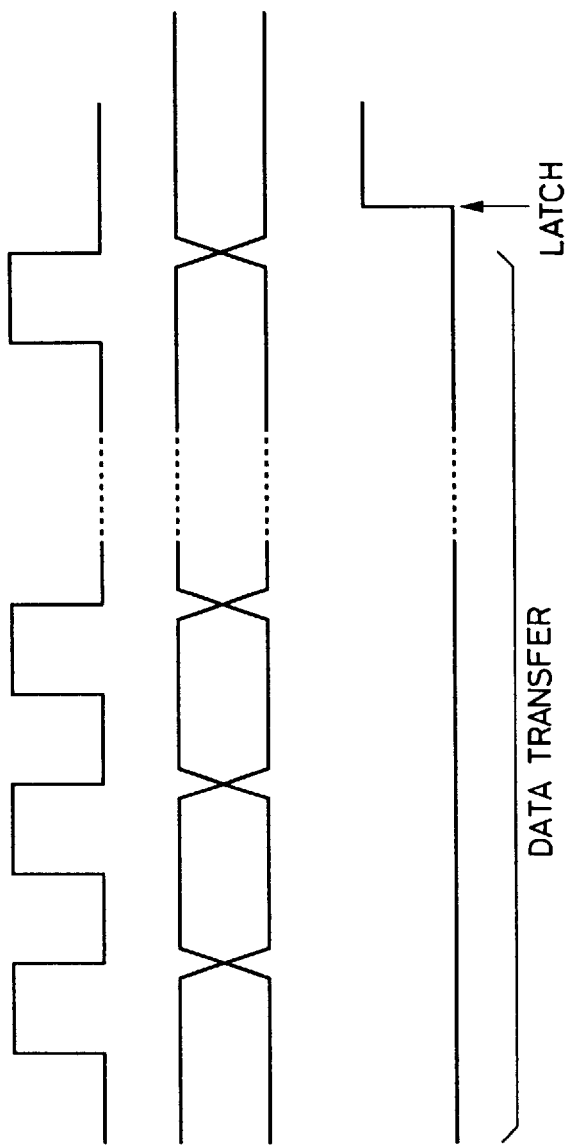
FIG. 13A CLK
FIG. 13B DATA
FIG. 13C LATCH

PRINTHEAD, PRINTING APPARATUS AND PRINTING METHOD USING PRINTHEAD

BACKGROUND OF THE INVENTION

Present invention relates to a printhead, a printing apparatus and a printing method using the printhead, more particularly to an ink-jet printhead used in a copying machine, a facsimile machine and a word processor, a printer used as an output terminal of a host computer, or a video printer, a printing apparatus and a printing method using the printhead.

FIGS. 11 and 12 respectively show the construction of a printhead of a conventional ink-jet printing apparatus, where electrothermal transducers and their driving circuits are formed on one circuit board, as disclosed in Japanese Patent Application No. 3-194118.

In FIGS. 11 and 12, reference numeral 101 denotes electrothermal transducers (heaters) for generating thermal energy; 102, power transistors for supplying an electric current of a predetermined voltage to the electrothermal transducers 101; 103, a time-divisional logical circuit for time-divisionally controlling power-supply to the power transistors 102 so as to time-divisionally heat the electrothermal transducers 101; 104, latches for holding serially-inputted print information for the electrothermal transducers; 105, a shift register for storing serially inputted data which indicates whether or not supply electric current to the respective electrothermal transducers 101 for discharging ink; 106, a power line for applying a predetermined voltage to the electrothermal transducers 101; and 107, a switch for supplying the print information latched at the latches 104 to the power transistors 102.

Note that the number of data bits as print information stored in the shift register 105 is the same as the number of the electrothermal transducers 101 and that of the power transistors 102. Further, the electrothermal transducers 101 are logically divided into a plurality of groups for the printing operation.

Also in FIGS. 11 and 12, as input terminals of various control signals to be supplied to the printhead, numeral 201 denotes a data input terminal for inputting print information (DATA); 202, a transfer-clock input terminal for inputting a transfer clock (CLK) for the shift register 105; 203, a latch-signal input terminal for supplying a latch timing signal (LATCH) to the latches 104; 204, a heater-enable signal input terminal for inputting a heater-enable signal (H.ENB) to determine timing for supplying the electric current to the respective electrothermal transducers 101; and 205, a selection-signal input terminal for inputting a selection signal (SEL) to select one of the groups of the electrothermal transducers 101.

FIGS. 13A–13C comprise a timing chart showing the various control signals for driving the circuits of the printhead as shown in FIGS. 11 and 12. The operation of the circuits in FIGS. 11 and 12 will be described with reference to FIGS. 13A–13C.

First, the transfer-clock input terminal 202 inputs a transfer clock (CLK). The shift register 105 performs data transfer in synchronization with the rising edge of the transfer clock (CLK). Print information (DATA) to turn on/off the respective electrothermal transducers 101 is supplied from the data input terminal 201. As the number of data bits storable in the shift register 105 is the same as the number of the electrothermal transducers 101 and that of the power transistors 102, the transfer-clock input terminal 202 inputs the transfer clocks (CLK's) of the number of the electrothermal transducers 101, to transfer the print information (DATA) to the shift register 105. Then, the latch-signal input terminal 203 inputs a latch signal (LATCH) to hold the print information corresponding to the respective electrothermal transducers 101 in the latches 104.

Thereafter, in the printhead having the construction as shown in FIG. 11, when the heater-enable signal input terminal 204 of the time-divisional logical circuit 103 receives a heater-enable signal (H.ENB) and the selection-signal input terminal 205 of the time-divisional logical circuit 103 receives a selection signal (SEL) at appropriate timings, the electric current is supplied to the power transistors 102 and then the electrothermal transducers 101 while the signals H.ENB and the SEL are turned on, thus ink droplets are discharged in accordance with the print information.

In the printhead having the construction as shown in FIG. 12, when the switch 107 is closed at appropriate timing, the electric current is supplied to the power transistors 102 and the electrothermal transducers 101 in correspondence with the time where the switch 107 is closed, thus ink droplets are discharged in accordance with the print information.

However, the above conventional constructions have the following problems:

(1) As the number of data bits storable in the shift register and the number of the latches are the same, the shift register and the latches occupy large space on the circuit board, thus preventing downsizing of the circuit board and reduction of production costs.

To solve this problem, the relation between the number of data bits (A) and the number of latches (B) may be A:B=1:n, and the shift register may be operated n times. Then, the space occupied with the devices necessary for the shift register can be reduced. However, this requires n latch-clock input terminals for operating the latches, and increases the number of wires for electrically connecting the lead frame with external devices. Finally, this increases the number of assembling steps of the printhead, and thus increases the production costs.

Upon realizing a multifunctional printhead in consideration of future technological improvement, a complicated combination of a lot of logical circuits is required for inputting variety of data, and for the data input, the logical circuits must have external input terminals. That is, the multifunctional printhead needs a lot of input terminals, which increases the number of assembling steps and production costs. Accordingly, it is preferable to reduce the number of input terminals to a minimum.

(2) As a printhead must always be capable of printing at a high-printing density, it is necessary, on the limited space on the circuit board of the printhead, to reduce the number of electric devices per pixel (bit) printing. To meet this requirement, the respective circuits as the-parts of the printhead must be further miniaturized. The electrothermal transducers, the power transistors and the switches are single-tip devices and therefore suitable for microminiaturization. The latches can also be easily miniaturized since these circuits comprise a relatively small number of constituent devices. However, in the shift register for storing information of a predetermined number of data bits, corresponding to the number of the electrothermal transducers, the power transistors, the switches and the latches, a large number of constituent devices per pixel printing are required. Since the number of devices must correspond to the number of electrothermal transducers, downsizing of the shift register is difficult.

SUMMARY OF THE INVENTION

The present invention has been made in consideration of the above situation, and has as its object to provide a printhead that achieves downsizing and reduction of manufacturing costs and contributes to high-density printing, a printing apparatus and a printing method using the printhead.

According to an aspect of the present invention, the foregoing object is attained by providing a printhead comprising: N printing elements for performing printing based on a N-bit print signal; N transducers for sending an electric current to the N printing elements; a first input terminal for inputting a print signal; a register for temporarily storing the print signal for N/n bits, where n, N and N/n are respectively positive integers and n<N; and a latch circuit for latching the N-bit print signal corresponding to said N printing elements, wherein said latch circuit latches a print signal for N/n hits at once.

According to another aspect of the present invention, the foregoing object is attained by providing a printing apparatus using the printhead described as above, comprising: input means for inputting a print signal from the outside of the apparatus; supply means for supplying a print signal corresponding to 1/n of the N printing elements of the printhead, based on the print signal inputted by the input means; selection means for selecting the printing elements from the N printing elements of the printhead to be used for printing using the print signal supplied by the supply means; instruction means for instructing, to send the electric current to the transducers, corresponding to the printing elements selected by the selection means, among the N transducers; and repetitive control means for repeating supplying of the print signal by the supply means, selection by the selection means and instruction by the instruction means n times.

According to still another aspect of the present invention, the foregoing object is attained by providing a printing method adopted to use the printhead described as above, comprising: an output step of outputting a print signal, corresponding to N/n printing elements of the N printing elements, to the printhead; a storage step of storing the print signal outputted in the output step into the register; a selection step of selecting the printing elements, from the N printing elements to be used for printing, using the print signal outputted in the output step; an instruction step of instructing to send the electric current to the transducers corresponding to the printing elements selected in the selection step among the N transducers; and a repetition step of repeating outputting in the output step, storing in the storage step, instruction in the instruction step n times.

In accordance with the present invention as described above, a printhead, having N printing elements, capable of storing a print signal for (1/n) of the N printing elements into a register, is controlled to perform printing, by repeating n times: to input a print signal corresponding to (N/n) printing elements;

to store the input print signal into the register; to select printing elements for printing based on the stored print signal; and to instruct to supply electric power to transducers corresponding to the selected printing elements, where N is a number of printing elements in the printhead; n is a positive integer; and N/n is a positive integer.

The present invention is particularly advantageous since the printing apparatus can use a smaller printhead having a smaller shift register capacity.

The downsizing of the printhead is the result from reduction of the circuits of the printhead, and thus greatly contributes to reduction of production costs. Further, the downsizing of the circuits contributes to packaging a large number of printing elements in a constant sized printhead. This achieves high-density printing by the smaller spacing of the printer elements.

Furthermore, a small-sized printing apparatus capable of high-density printing can be provided with low costs by using the downsized printhead.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 4A–4E a timing chart for explaining the operation of the printhead in FIG. 3;

FIGS. 13A–13C comprise a timing chart for explaining the operation of the conventional printheads in FIGS. 11 and 12.

DETAILED DESCRIPTION OF THE PREFERRED EMBODIMENT(S)

Preferred embodiments of the present invention will be described in detail in accordance with the accompanying drawings.

<Brief Description of Apparatus Main Unit>

Figure 1:
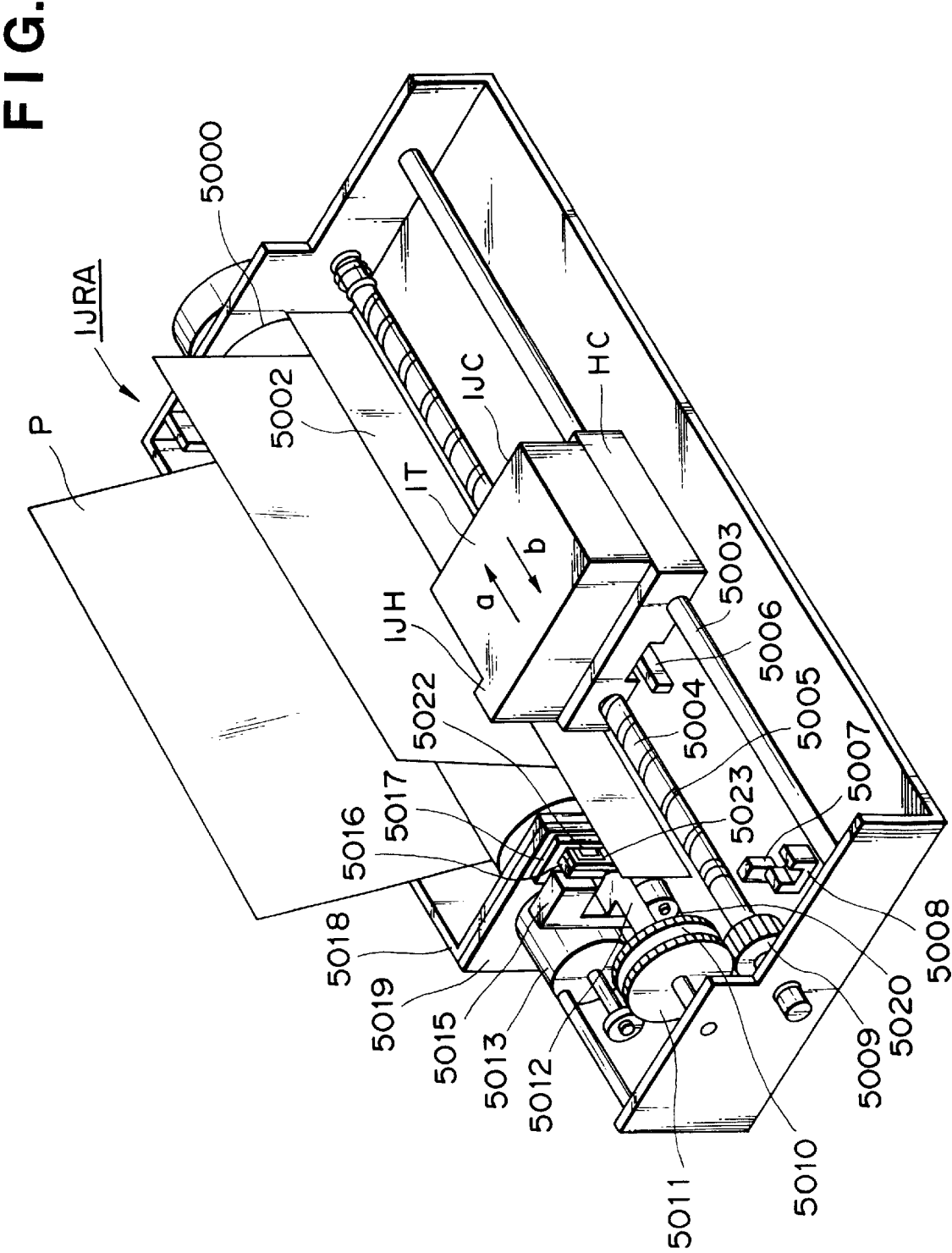
FIG. 1 is a perspective view showing the construction of an ink-jet printer IJRA as a typical embodiment of the present invention.

FIG. 1 is a perspective view showing the outer appearance of an ink-jet printer IJRA as a typical embodiment of the present invention. Referring to FIG. 1, a carriage HC engages with a spiral groove 5005 of a lead screw 5004, which rotates via driving force transmission gears 5009 to 5011 upon forward/reverse rotation of a driving motor 5013. The carriage HC has a pin (not shown), and is reciprocally scanned in the directions of arrows a and b in FIG. 1. An integrated ink-jet cartridge IJC which incorporates a printhead IJH and an ink tank IT is mounted on the carriage HC. Reference numeral 5002 denotes a sheet holding plate, which presses a paper sheet against a platen 5000, ranging from one end to the other end of the scanning path of the carriage. Reference numerals 5007 and 5008 denote photocouplers which serve as home position detectors for recognizing the presence of a lever 5006 of the carriage in a corresponding region, and used for switching, e.g., the rotating direction of the motor 5013. Reference numeral 5016 denotes a member for supporting a cap member 5022, which caps the front surface of the printhead IJH; and 5015, a suction device for sucking ink residue through the interior of the cap member. The suction device 5015 performs suction recovery of the printhead via an opening 5023 of the cap member 5015. Reference numeral 5017 denotes a cleaning blade; 5019, a member which allows the blade to be movable in the back-and-forth direction of the blade. These members are supported on a main unit support plate 5018. The shape of the blade is not limited to this, but a known cleaning blade can be used in this embodiment. Reference numeral 5021 denotes a lever for initiating a suction operation in the suction recovery operation. The lever 5021 moves upon movement of a cam 5020, which engages with the carriage, and receives a driving force from the driving motor via a known transmission mechanism such as clutch switching.

The capping, cleaning, and suction recovery operations are performed at their corresponding positions upon operation of the lead screw 5005 when the carriage reaches the home-position side region. However, the present invention is not limited to this arrangement as long as desired operations are performed at known timings.

<Construction of Controller>

Figure 2:
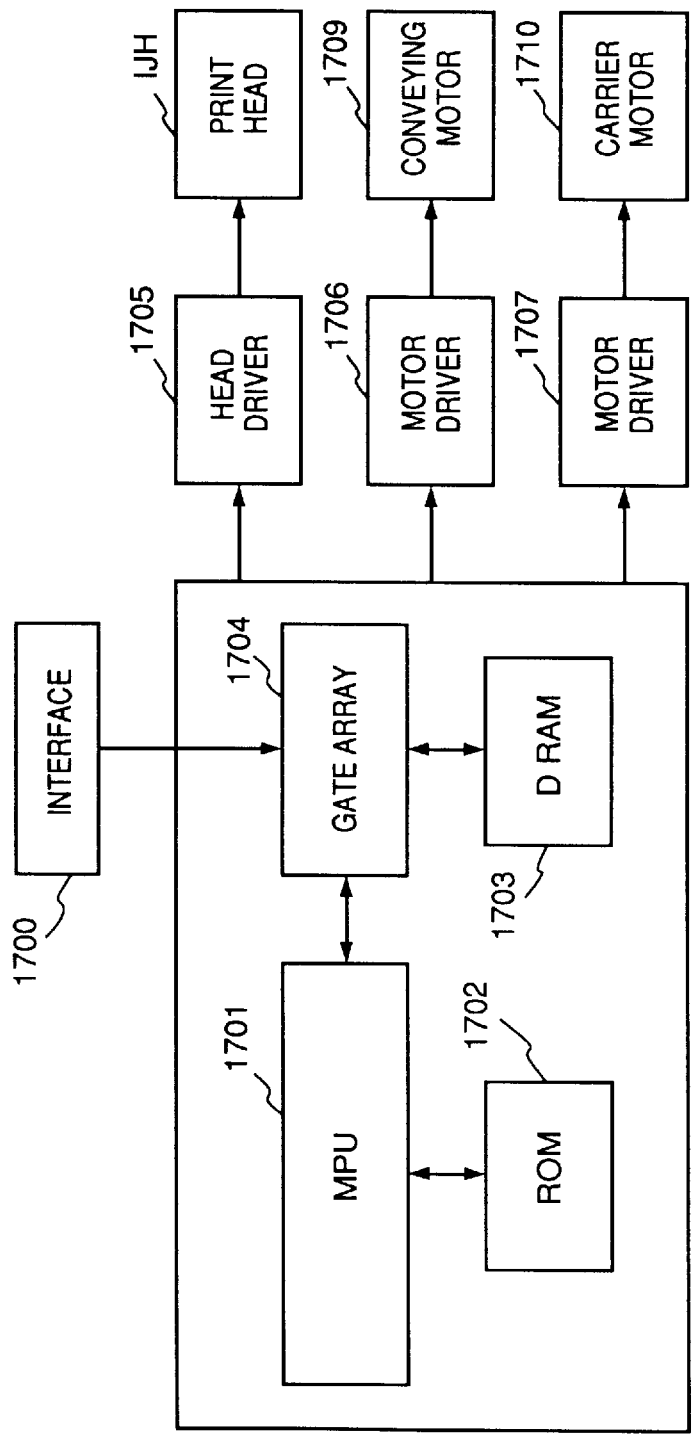
FIG. 2 is a block diagram showing the construction of the ink-jet printer IJRA.

Next, the control system configuration for controlling the recording by the above recording apparatus will be described with reference to a block diagram of FIG. 2 showing a controller. In FIG. 2, reference numeral 1700 denotes an interface for inputting a print signal; 1701, an MPU; 1702, a program ROM for storing control programs performed by the MPU 1701; 1703, a dynamic RAM for storing various data (the print signal, print data to be supplied to printhead IJH, etc.); 1704, a gate array for supplying the recording data to the printhead IJH, and for controlling data transfer among the interface 1700, the MPU 1701 and the RAM 1703; 1710, a carrier motor for carrying the recording head 1708; 1709, a conveying motor for conveying a recording sheet; 1705, a head driver for driving the printhead IJH; and 1706 and 1707, motor drivers for respectively driving the conveying motor 1709 and the carrier motor 1710.

In the above construction, when a print signal enters the interface 1700, the signal is converted into print data for printing between the gate array 1704 and the MPU 1701. The motor drivers 1706 and 1707 are activated, and the printhead IJH is driven in accordance with the print data transferred to the head driver 1705, thus printing is performed.

Next, embodiments of the printhead IJH mounted on the ink-jet printer IJRA having the above construction will be described below.

[First Embodiment]

Figure 3:
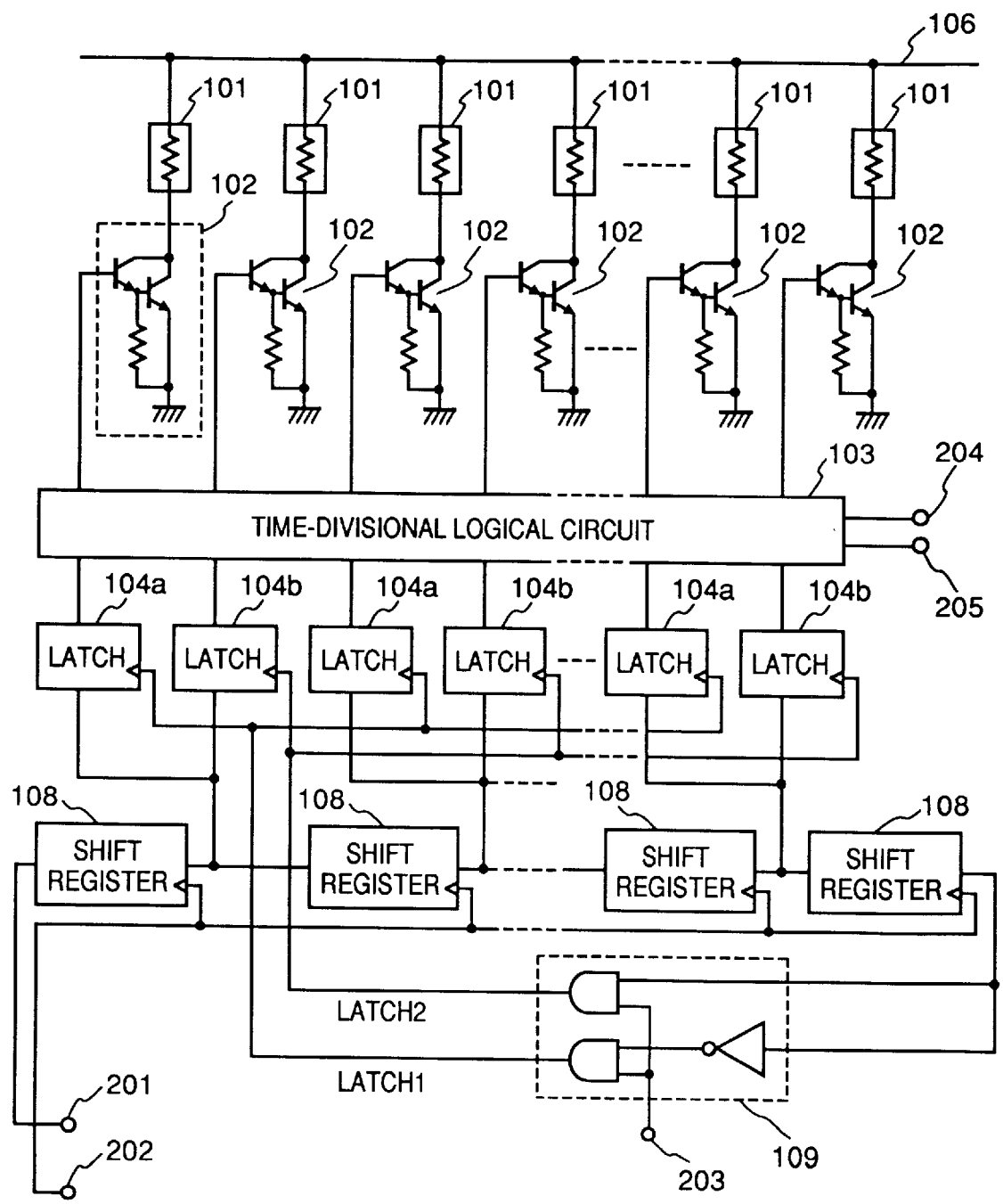
FIG. 3 is a block diagram showing a printhead driver logic according to a first embodiment of the present invention.

FIG. 3 is a block diagram showing the printhead driver logic according to a first embodiment of the present invention. Note that in FIG. 3, the elements corresponding to those in FIGS. 11 and 12 have the same reference numerals, and the explanations of those elements will be omitted. Also, regarding control signals, the same signals as those in the prior art have the same symbols and the explanations of those signals will be omitted.

In FIG. 3, numerals 104a and 104b denote latches for temporarily holding print information; 108, shift registers for inputting print information (DATA) supplied from the data input terminal 201 in accordance with a transfer clock (CLK) from the transfer-clock input terminal 202, and outputting the print information (DATA) to the latches 104a or the latches 104b; 109, a logical circuit for outputting a latch-selection signal (LATCH1 or LATCH2) instructing the latches 104a or the latches 104b to latch the print information (DATA) outputted from the shift registers 108, in accordance with the latch signal (LATCH) supplied from the latch-signal input terminal 203 and the print information (DATA) outputted from the shift registers 108.

As shown in FIG. 3, in the printhead IJH, one shift register 108 is connected to two latches 104a and 104b. The output from the shift register 108 is latched by either the connected latch 104a or latch 104b at a time. The shift registers 108 have a total storage capacity for storing the print information (DATA) used by the half of the electrothermal transducers 101.

As it is apparent from the above construction, similar to the conventional printheads, the printhead IJH in this embodiment has the plurality of electrothermal transducers 101, divided into a plurality of groups. The selection-signal input terminal 205 inputs a selection signal (SEL), and a specific electrothermal transducer group is selected in accordance with the selection signal. Thereafter, the electrothermal transducers of the selected group are heated, and ink droplets are discharged from discharge orifices (not shown), one-to-one corresponding to the electrothermal transducers, to a recording medium.

Figure 5:
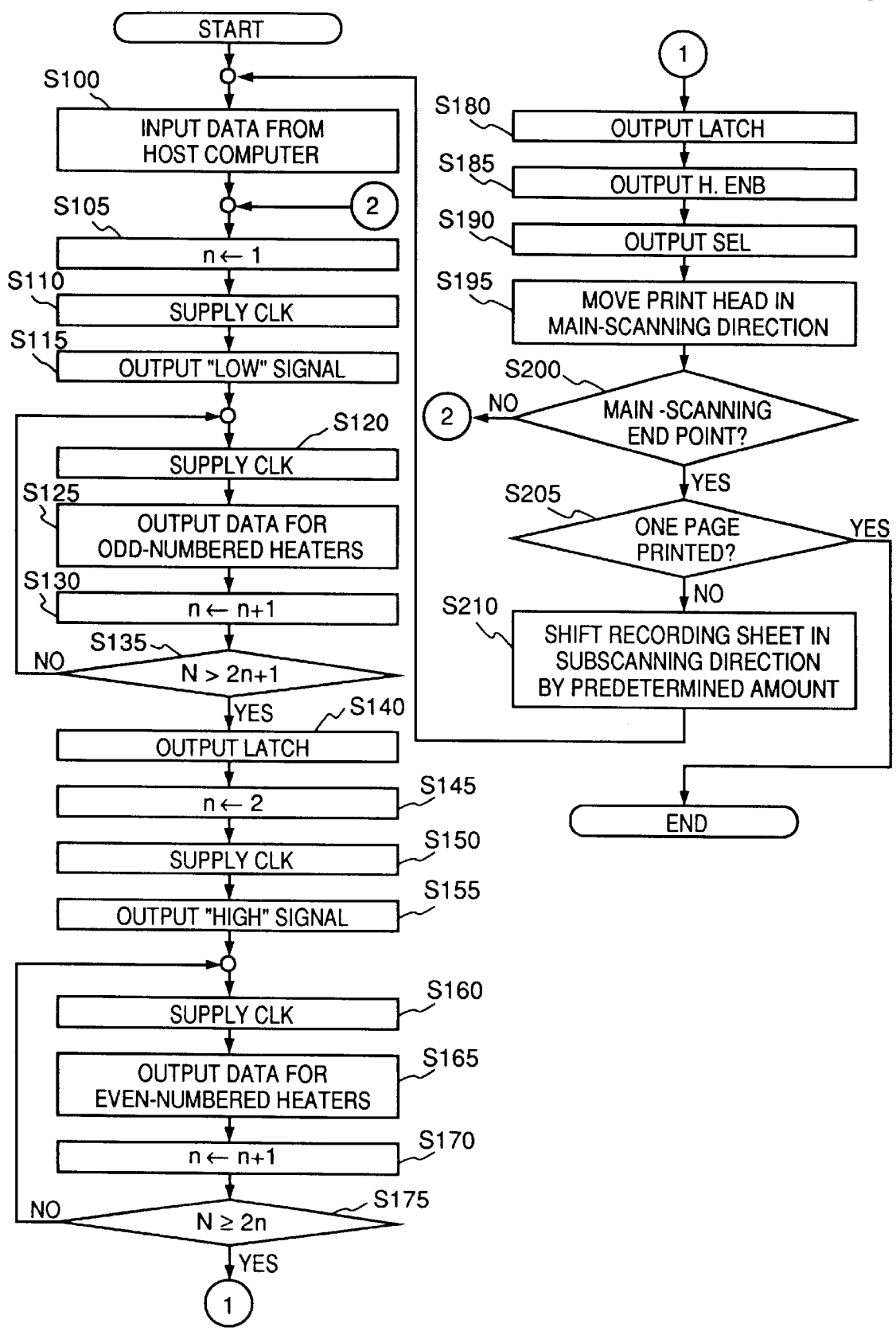
FIG. 5 is a flowchart showing the printing operation of a controller according to the first embodiment.

Next, the operation of the printhead IJH in FIG. 3 will be described with reference to the timing chart of FIGS. 4A–4E and the flowchart of FIG. 5 showing the printing operation of a controller of the ink-jet printer IJRA. Note that in this example, the printhead IJH has N (even number) electrothermal transducers aligned in a recording-sheet shifting direction (subscanning direction), numbered 1, 2, 3, 4 ... N, from the left in FIG. 3. The direction in which the carriage of the printhead IJH is moved is referred to as a main-scanning direction.

First, in step S100, print data is received from a host computer (not shown) and stored into the DRAM 1703. Next, in step S105, a counter value (n) is initialized (n=1). In step S110, a transfer clock (CLK) is supplied to the transfer-clock input terminal 202 (401 in FIG. 4A), and in step S115, a "Low" level signal is inputted into the data input terminal 201 (402 in FIG. 4B) as the print information (DATA).

Next, the process proceeds to steps S120 to S135, in which the transfer clock (CLK) is supplied to output the print information (DATA), corresponding to odd-numbered electrothermal transducers 101, to the data input terminal 201, and the counter value (n) is incremented by one. In this manner, as the print information (DATA) corresponding to the (N/2) electrothermal transducers 101 has been stored into the shift registers 108, the process proceeds to step S140. At this time, the "Low" level signal inputted in step S115 is outputted from the rightmost shift register 108 in FIG. 3 into the logical circuit 109.

In step S140, a latch signal (LATCH) is outputted to the latch-signal input terminal 203 (403 in FIG. 4C). At this time, a latch-selection signal (LATCH1) outputted from the logical circuit 109 has a "High" level (404 in FIG. 4D), and the print information (DATA) stored in the shift register 108 is latched by the latches 104a.

Next, the process proceeds to step S145, in which the counter value (n) is initialized again (n=2), and in step S150, a transfer clock (CLK) is supplied to the transfer-clock input terminal 202 (405 in FIG. 4A). In step S155, a "High" level signal is inputted into the data input terminal 201 (406 in FIG. 4B) as the print information (DATA). In steps S160 to S175, a transfer clock (CLK) is outputted to supply the print information (DATA), corresponding to even-numbered electrothermal transducers 101, to the data input terminal 201, and the counter value (n) is incremented by one. In this manner, as the print information (DATA) corresponding to the (N/2) electrothermal transducers 101 has been stored into the shift registers 108, the process proceeds to step S180. At this time, the "High" level signal inputted in step S155 is outputted from the rightmost shift register 108 in FIG. 3, into the logical circuit 109.

Then, in step S180, a latch signal (LATCH) is supplied to the latch-signal input terminal 203 (407 in FIG. 4C). At this time, a latch-selection signal (LATCH2) outputted from the logical circuit 109 has a "High" level (408 in FIG. 4E), and the print information (DATA) stored in the shift registers 108 is latched by the latches 104b.

In this manner, the print information corresponding to the odd-numbered electrothermal transducers and the print information corresponding to the even-numbered electrothermal transducers are separately transferred to the printhead IJH, and the latches 104a and the latches 104b latch the print information corresponding to all the electrothermal transducers 101.

Next, the process proceeds to step S185, in which a heater-enable signal (H.ENB) is inputted into the heater-enable signal input terminal 204, and in step S190, a selection signal (SEL) is inputted into the selection-signal input terminal 205. In this manner, the electric current is time-divisionally supplied to the respective electrothermal transducers, and as a result, ink droplets are discharged on a recording sheet, thus printing is performed.

Thereafter, in step S195, the printhead is moved by the carrier motor 1710, by a predetermined amount in the main-scanning direction. In step S200, whether or not the printhead is positioned at a terminal position of the movement is examined. If it is determined that the printhead has not reached the terminal position, the process returns to step S105 to continue the printing operation. If it is determined that the printhead has reached the terminal position, the process proceeds to step S205, in which whether or not printing for one page of recording sheet has been completed is examined. If NO, the process proceeds to step S210, in which the recording sheet is shifted by the conveying motor 1709, by a predetermined amount in the subscanning direction. Thereafter, the process returns to step S100 to continue the printing operation. If YES in step S205, the process ends.

According to the present embodiment, the print information is divided into the print information corresponding to the odd-numbered electrothermal transducers and the print information corresponding to the even-numbered electrothermal transducers, and these print informations are separately transferred to the printhead. This reduces the capacity of the shift registers to the half of the capacity of the conventional shift registers. Further, this embodiment does not increase the number of input terminals, and does not change the hardware interface between the controller and the printhead.

As the capacity of the shift registers which occupy much space on the circuit board of the printhead can be reduced, the number of electric devices constructing the shift register can be reduced, thus downsizing of the circuit board can be greatly improved.

It should be noted that as this embodiment does not change the hardware interface between the controller and the printhead, the logical circuit 109 is integrated in the printhead. However, this does not pose any limitation upon the present invention. For example, to improve downsizing of the printhead, the logical circuit 109 may be provided outside of the printhead as shown in FIG. 6, regardless of the hardware interface between the controller and the printhead, and as shown in FIGS. 7A–7D, the latch signal (LATCH) may be replaced with latch-selection signals (LATCH1 and LATCH2) supplied from the outside, instead of sending the "Low"/"High" level signal for transferring the print information to the odd-numbered/even-numbered electrothermal transducers.

Figure 6:
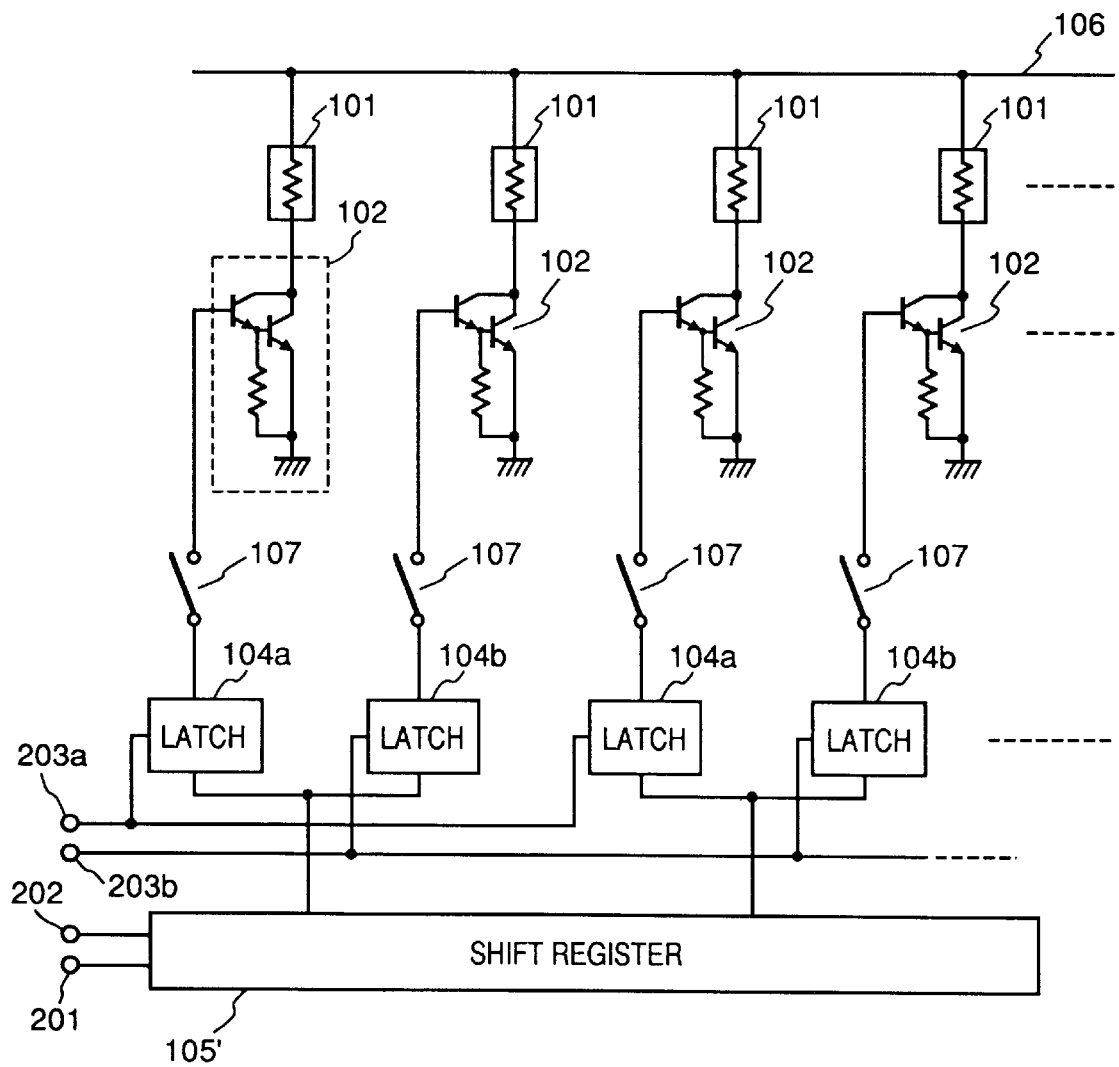
FIG. 6 is a block diagram showing a printhead driver logic as a modification to the first embodiment.
Figure 7:
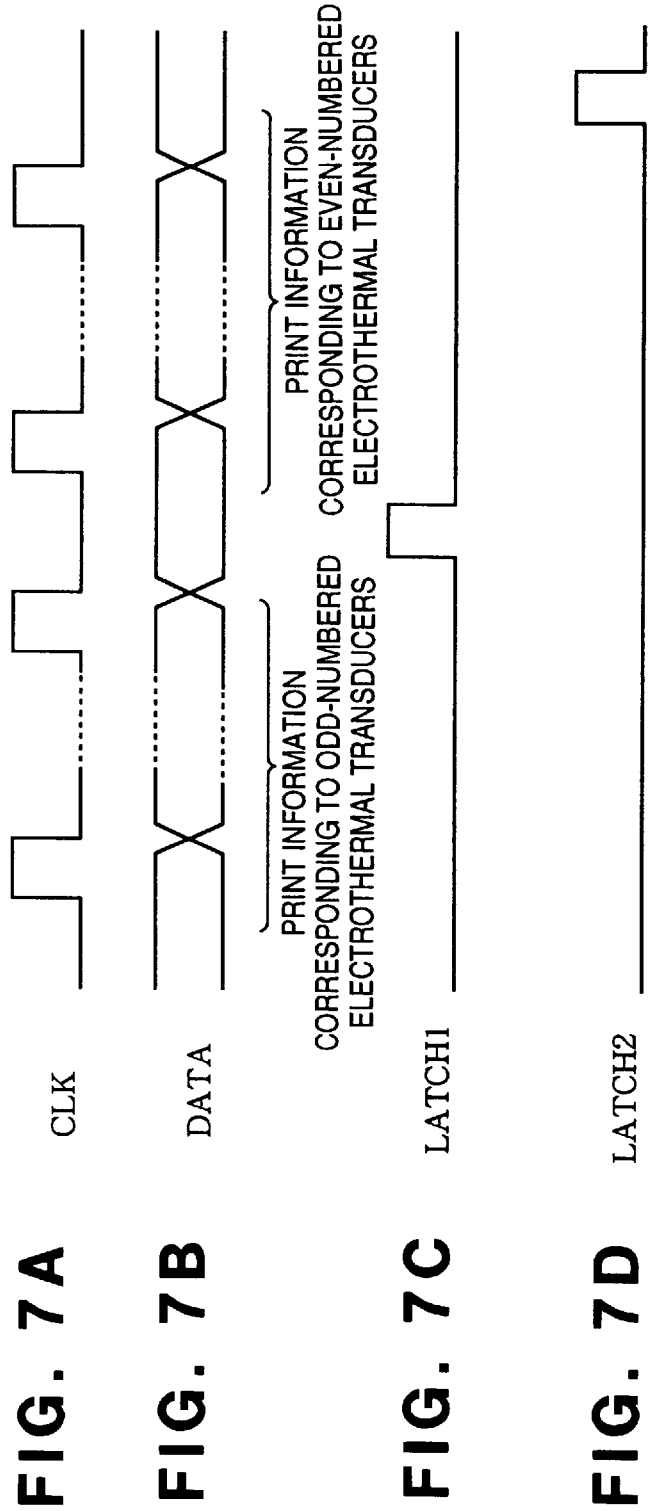
FIGS. 7A–7D comprise a timing chart for explaining the operation of the printhead in FIG. 6.
Figure 11:
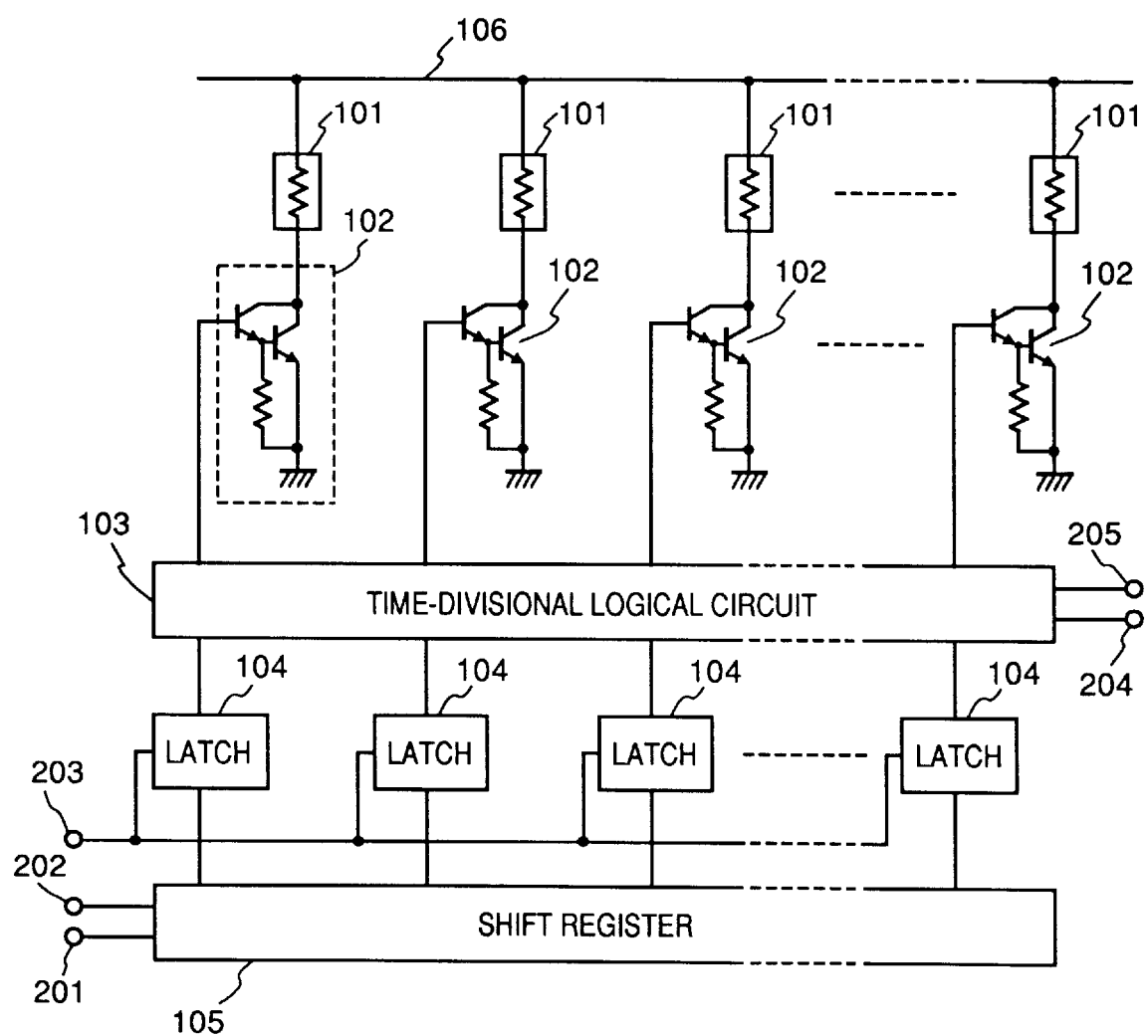
FIGS. 11 and 12 are block diagrams respectively showing an example a conventional printhead driver logic.
Figure 12:
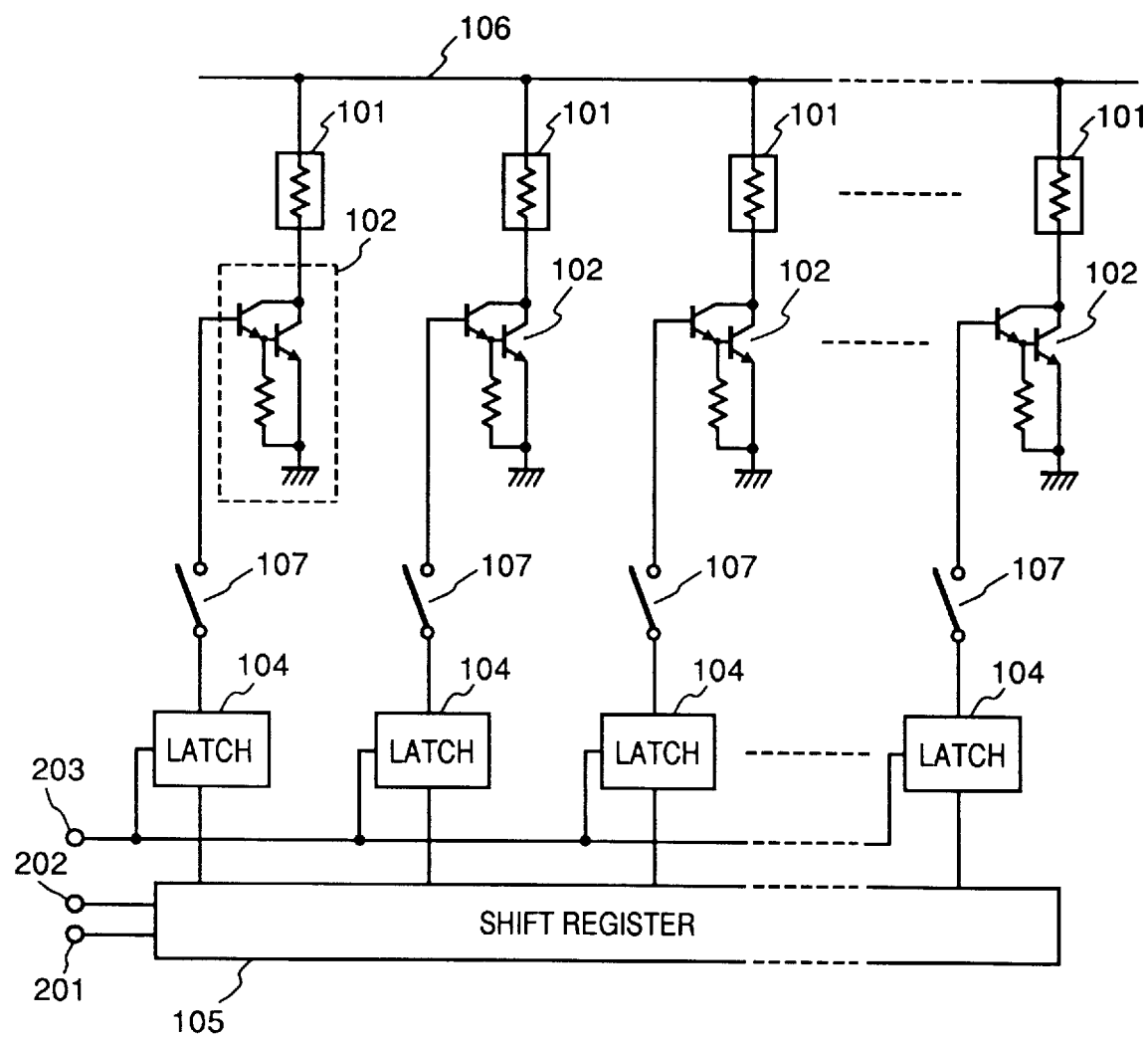

In FIG. 6, numeral 105' denotes a shift register having a capacity which is half of the capacity of the shift register 105 in FIG. 11; 203a, a latch-selection signal input terminal for inputting the latch-selection signal (LATCH1); and 203b, a latch-selection signal input terminal for inputting the latch-selection signal (LATCH2).

[Second Embodiment]

Figure 8:
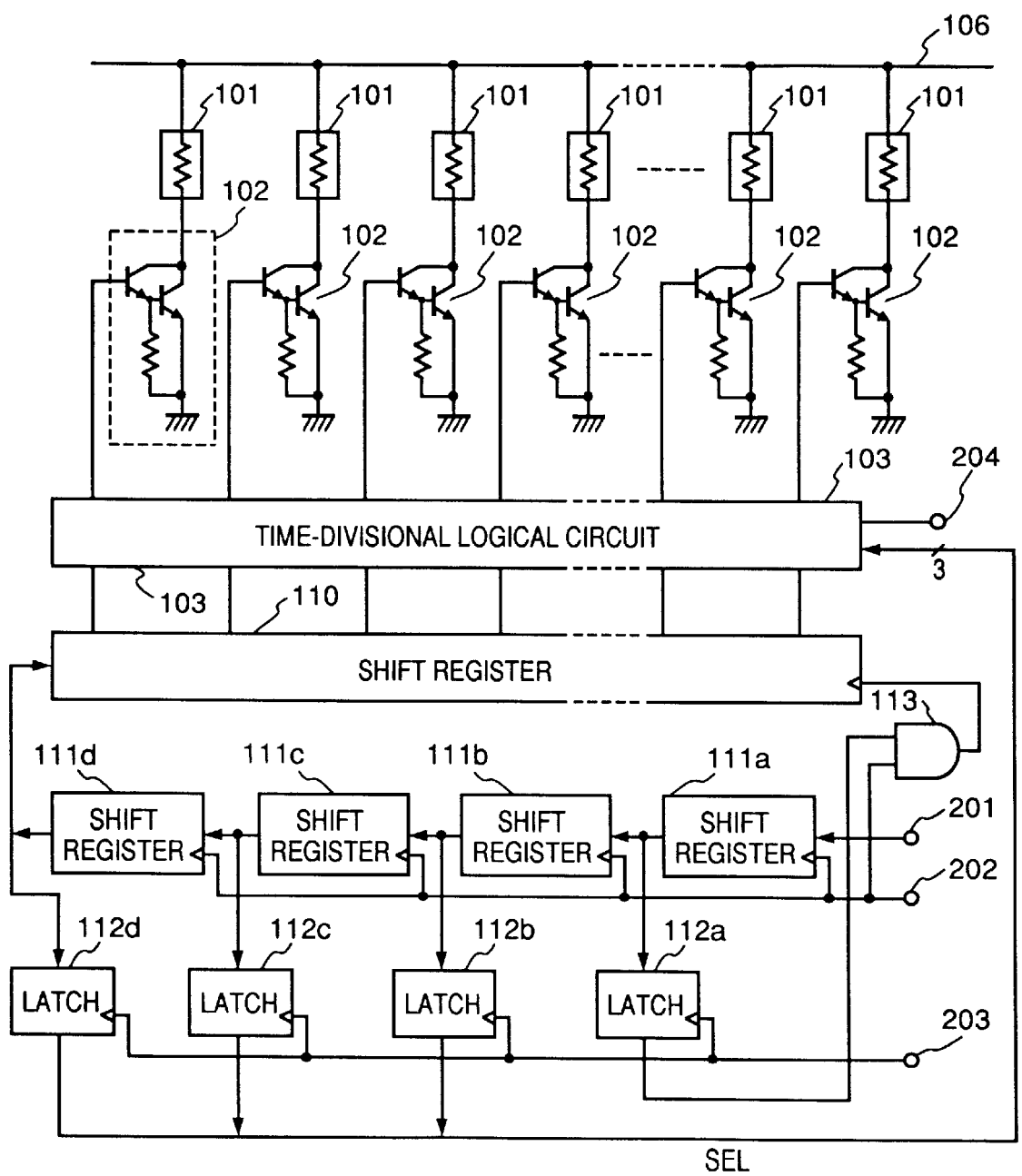
FIG. 8 is a block diagram showing the construction of a printhead according to a second embodiment of the present invention.

FIG. 8 is a block diagram showing the printhead driver logic according to a second embodiment. In FIG. 8, the elements corresponding to those in FIGS. 11 and 12 have the same reference numerals, and the explanations of these elements will be omitted. Also, regarding the control signals, the signals corresponding to those in the prior art and the first embodiment have the same symbols, and the explanations of these signals will be omitted.

In FIG. 8, numeral 110 denotes a shift register for supplying print information (DATA) to the time-divisional logical circuit 103; 111a to 111d, shift registers for shifting the print information (DATA) in accordance with a transfer clock (CLK) supplied from the transfer-clock input terminal 202; 112a to 112d, latches for holding the print information (DATA) for one bit, in accordance with a latch signal (LATCH) supplied from the latch-signal input terminal 203; and 113, an AND circuit for obtaining a logical product between the output from the latch 112a and the transfer clock (CLK) and outputting the logical product as a shift clock to the shift register 110.

The outputs from the latches 112b to 112d are inputted as a 3-bit selection signal (SEL) into the time-divisional logical circuit 103. In this example, the electrothermal transducers 101 are logically divided into eight groups in correspondence with the 3-bit selector signal (SEL). The time-divisional logical circuit 103 time-divisionally selects one of the divided electrothermal transducer groups in accordance with a value indicated by the 3-bit selection signal (SEL), and provides the print information (DATA) to selected one of these electrothermal transducer groups. In this manner, as the time-divisional logical circuit 103 only supplies the print data to ⅛ of the electrothermal transducers 101 at a time, the shift register 110 may have a capacity for storing data corresponding to ⅛ of the N electrothermal transducers 101.

Next, the operation of the ink-jet printer IJH in FIG. 8 will be described with reference to the timing chart of FIGS. 9A–9C and the flowchart of FIG. 10. FIG. 10 shows the printing operation of a controller of the ink-jet printer IJRA according to the second embodiment. In FIG. 10, the explanations of the data input from the host computer, the moving of the printhead and the shifting of the recording sheet in the steps corresponding to those in FIG. 5 will be omitted.

First, in step S300, a counter value (m) is initialized to "0". In step S305, a transfer clock (CLK) is supplied to the transfer-clock input terminal 202 (901 in FIG. 9A), and in step S310, a "High" level signal is inputted, as the print information (DATA), from the data input terminal 201 into the shift register 101a (902 in FIG. 9B). In step S315, a latch signal (LATCH) is inputted from the latch-signal input terminal 203 (903 in FIG. 9C). As a result, the AND circuit 113 provides a shift clock to initialize the shift register 110.

Next, the process proceeds to step S320 to initialize a data-bit counter value (n) to "0". Next, in steps S325 to 340, a transfer clock (CLK) is supplied to the transfer-clock input terminal 202 (904 in FIG. 9A), and the print information (DATA) is supplied to the data input terminal 201 (905 in FIG. 9B). The input of print information (DATA) is continued, while the number of data bits is counted by a data-bit counter, until counter value (n) becomes the 1/8 of the number of electrothermal transducers (N). When it is determined that the number of data bits is 1/8 of the number of electrothermal transducers (N), the process proceeds to step S345.

Figure 9:
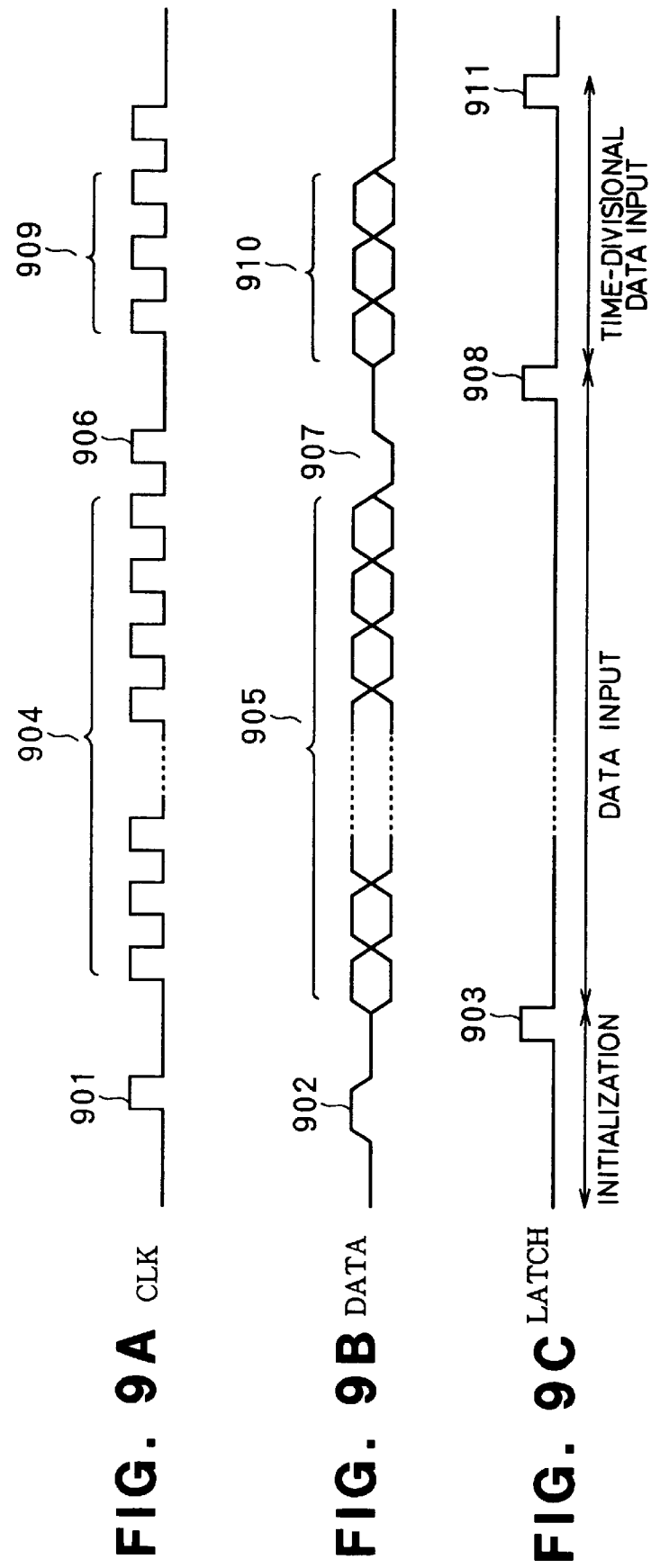
FIGS. 9A–9C comprise a timing chart for explaining the operation of the printhead in FIG. 8.
Figure 10:
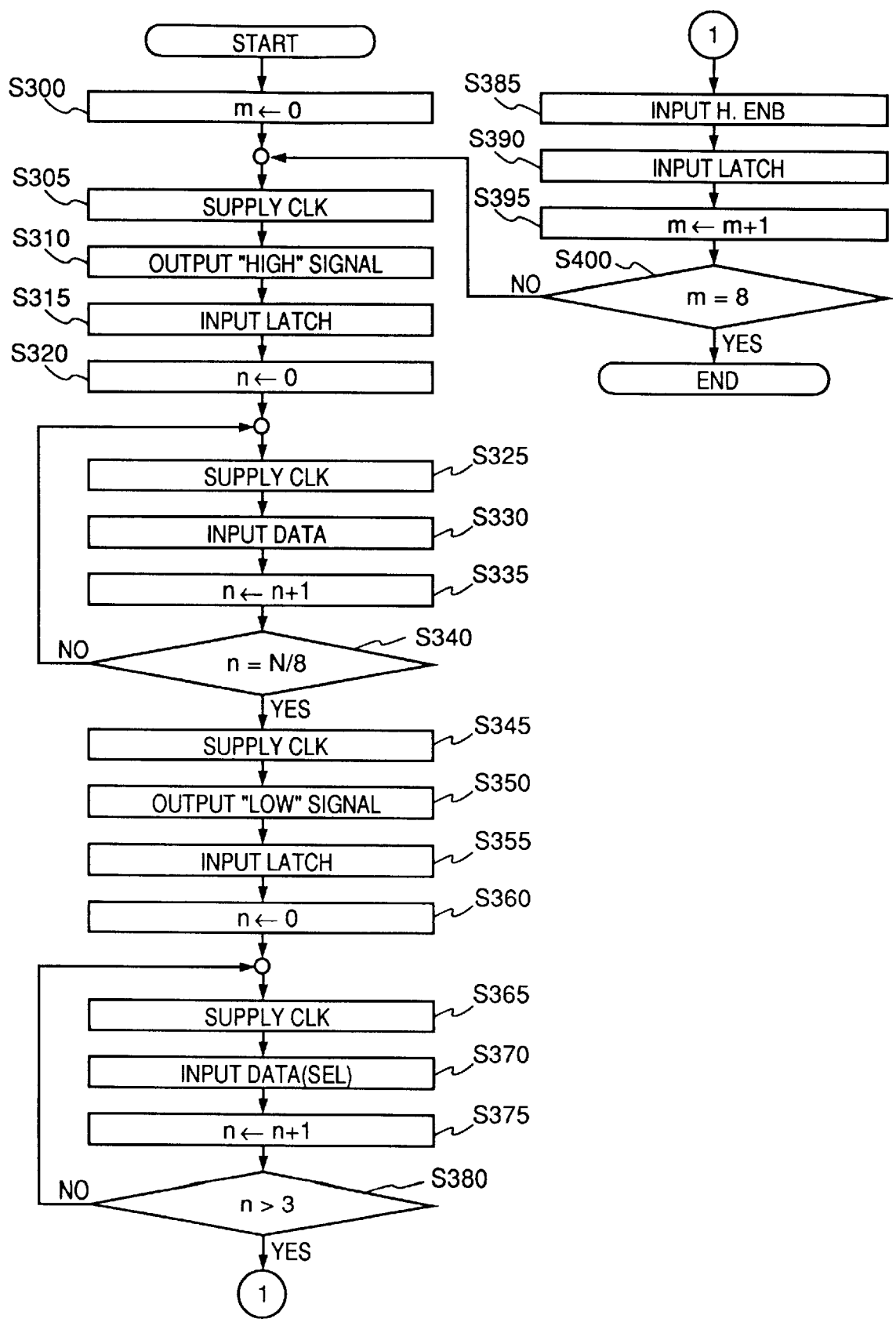
FIG. 10 is a flowchart showing printing operation of a controller according to the second embodiment.

Next, in steps S345 to S355, a transfer clock (CLK) is supplied to the transfer-clock input terminal 202 (906 in FIG. 9A), the n a "Low" level signal is inputted, as the print information (DATA), from the data input terminal 201 to the shift register 101a (907 in FIG. 9B), and a latch signal (LATCH) is inputted from the latch-signal input terminal 203 (908 in FIG. 9C). As the "Low" level signal is latched, the supply of shift clocks from the AND circuit 113 to the shift register 110 is stopped, thus the data in the shift register 110 is held.

Next, in step S360, the data-bit counter (n) is reset (n=0). Then, in steps S365 to S380, a transfer clock (CLK) is supplied to the transfer-clock input terminal 202 (909 in FIG. 9A), an d a 3-bit selection signal (SEL) as the print information (DATA) is supplied to the data input terminal 201. In step S385, a heater-enable signal (H.ENB) is inputted into the heater-enable signal input terminal 204, and in step S390, a latch signal (LATCH) is inputted from the latch-signal input terminal 203 (911 in FIG. 9C). As a result, a 3-bit selection signal (SEL) is provided from the latches 112b to 112d to the time-divisional logical circuit 103, and one of the eight electrothermal transducer groups is selected. The electrothermal transducers 101 of the selected group receive the electric current, and ink droplets are discharged on the recording sheet. Thus, printing is performed.

Next, in step S395, the counter value (m) is incremented by one (+1), and in step S400, whether or not the counter value m is "8" is examined. If NO (m<8), it is determined that the electric current has not been sent to the all the eight groups of the electrothermal transducers 101 and that the printing operation is continued. The process returns to step S305 to perform printing operation with respect to the next 1/8 of electrothermal transducer groups. On the other hand, if YES (m=8) in step S400, it is determined that the electric current has been sent to all the groups of the electrothermal transducers 101, and the process ends.

As described above, the present embodiment uses four one-bit shift registers, four latches and one logical circuit to sequentially input print information to 1/8 of electrothermal transducers at a time. This reduces the capacity of the shift registers to 1/8 of the conventional shift register capacity. Further, in comparison with the conventional construction in which the number of latches corresponds to that of electrothermal transducers, the present embodiment can simplify the construction by using only four latches. Furthermore, the printhead needs no selection-signal input terminal for inputting a selection signal (SEL), which simplifies the hardware interface between the printhead and the controller. This improves downsizing of printhead, and further, enables miniaturization of, e.g., a data cable between the printhead and the controller.

Each of the embodiments described above has exemplified a printer, which comprises means (e.g., an electrothermal transducer, laser beam generator, and the like) for generating heat energy as energy utilized upon execution of ink discharge, and causes a change in state of an ink by the heat energy, among the ink-jet printers. According to this ink-jet printer and printing method, a high-density, high-precision printing operation can be attained.

As the typical arrangement and principle of the ink-jet printing system, one practiced by use of the basic principle disclosed in, for example, U.S. Pat. Nos. 4,723,129 and 4,740,796 is preferable. The above system is applicable to either one of the so-called on-demand type or continuous type. Particularly, in the case of the on-demand type, the system is effective because, by applying at least one driving signal, which corresponds to printing information and gives a rapid temperature rise exceeding film boiling, to each of electrothermal transducers arranged in correspondence with a sheet or liquid channels holding a liquid (ink), heat energy is generated by the electrothermal transducer to effect film boiling on the heat acting surface of the printhead, and consequently, a bubble can be formed in the liquid (ink) in one-to-one correspondence with the driving signal. By discharging the liquid (ink) through a discharge opening by growth and shrinkage of the bubble, at least one droplet is formed. If the driving signal is applied as a pulse signal, the growth and shrinkage of the bubble can be attained instantly and adequately to achieve discharge of the liquid (ink) with the particularly high response characteristics.

As the pulse driving signal, signals disclosed in U.S. Pat. Nos. 4,463,359 and 4,345,262 are suitable. Note that further excellent printing can be performed by using the conditions described in U.S. Pat. No. 4,313,124 of the invention which relates to the temperature rise rate of the heat acting surface.

As an arrangement of the printhead, in addition to the arrangement as a combination of discharge nozzles, liquid channels, and electrothermal transducers (linear liquid channels or right-angle liquid channels) as disclosed in the above specifications, the arrangement using U.S. Pat. Nos. 4,558,333 and 4,459,600, which disclose the arrangement having a heat acting portion arranged in a flexed region is also included in the present invention. In addition, the present invention can be effectively applied to an arrangement based on Japanese Patent Laid-Open No. 59-123670 which discloses the arrangement using a slot common to a plurality of electrothermal transducers as a discharge portion of the electrothermal transducers, or Japanese Patent Laid-Open No. 59-138461 which discloses the arrangement having an opening for absorbing a pressure wave of heat energy in correspondence with a discharge portion.

Furthermore, as a full line type printhead having a length corresponding to the width of a maximum printing medium which can be printed by the printer, either the arrangement which satisfies the full-line length by combining a plurality of printheads as disclosed in the above specification or the arrangement as a single printhead obtained by forming printheads integrally can be used.

In addition, not only a cartridge type printhead in which an ink tank is integrally arranged on the printhead itself, as described in the above embodiments but also an exchangeable chip type printhead which can be electrically connected to the apparatus main unit and can receive ink from the apparatus main unit upon being mounted on the apparatus main unit can be applicable to the present invention.

It is preferable to add recovery means for the printhead, preliminary auxiliary means, and the like provided as an arrangement of the printer of the present invention since the printing operation can be further stabilized. Examples of such means include, for the printhead, capping means, cleaning means, pressurization or suction means, and preliminary heating means using electrothermal transducers, another heating element, or a combination thereof. It is also effective for stable printing to provide a preliminary discharge mode which performs discharge independently of printing.

Furthermore, as a printing mode of the printer, not only a printing mode using only a primary color such as black or the like, but also at least one of a multicolor mode using a plurality of different colors or a full-color mode achieved by color mixing can be implemented in the printer either by using an integrated printhead or by combining a plurality of printheads.

Moreover, in each of the above-mentioned embodiments of the present invention, it is assumed that the ink is a liquid. Alternatively, the present invention may employ an ink which is solid at room temperature or less and softens or liquefies at room temperature, or an ink which liquefies upon application of a use printing signal, since it is a general practice to perform temperature control of the ink itself within a range from 30° C. to 70° C. in the ink-jet system, so that the ink viscosity can fall within a stable discharge range.

In addition, in order to prevent a temperature rise caused by heat energy by positively utilizing it as energy for causing a change in state of the ink from a solid state to a liquid state, or to prevent evaporation of the ink, an ink which is solid in a non-use state and liquefies upon heating may be used. In any case, an ink which liquefies upon application of heat energy according to a printing signal and is discharged in a liquid state, an ink which begins to solidify when it reaches a printing medium, or the like, is applicable to the present invention. In this case, an ink may be situated opposite electrothermal transducers while being held in a liquid or solid state in recess portions of a porous sheet or through holes, as described in Japanese Patent Laid-Open No. 54-56847 or 60-71260. In the present invention, the above-mentioned film boiling system is most effective for the above-mentioned inks.

In addition, the ink-jet printer of the present invention may be used in the form of a copying machine combined with a reader, and the like, or a facsimile apparatus having a transmission/reception function in addition to an image output terminal of an information processing equipment such as a computer.

The present invention can be applied to a system constituted by a plurality of devices, or to an apparatus comprising a single device. Furthermore, the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. A printhead having N printing elements for performing printing based on a print signal, comprising:
   a first input terminal for inputting the print signal;
   a shift register for storing the print signal, inputted through said first input terminal, corresponding to N/n printing elements where n, N and N/n are respectively positive integers and n<N;
   a plurality of latch circuits for latching the print signal stored in said shift register, wherein each of said plurality of latch circuits latches the print signal corresponding to N/n printing elements;
   a selecting circuit for selecting a latch circuit which is used for latching the print signal stored in said shift register from said plurality of latch circuits; and
   a selective drive circuit for selectively driving N/n printing elements of the N printing elements, based on the print signal latched by said latch circuit selected by said selecting circuit.

2. The printhead according to claim 1, further comprising a plurality of orifices for discharging ink.

3. The printhead according to claim 1, further comprising:
   a second input terminal for inputting a latch signal,
   wherein said selecting circuit selects said latch circuit by selectively supplying the latch signal inputted through the second input terminal to a portion of said plurality of latch circuits.

4. The printhead according to claim 3, wherein the value of n is "2".

5. The printhead according to claim 3, wherein n latch circuits of said plurality of latch circuits are connected to one shift register.

6. The printhead according to claim 1, wherein said printhead is an ink-jet printhead which performs printing by discharging ink.

7. The printhead according to claim 1, wherein said printhead, having a thermal-energy transducer for generating thermal energy to be provided to ink, discharges the ink utilizing the thermal energy.

8. A printing apparatus using the printhead in claim 1, comprising:
   input means for inputting a print signal from outside of the apparatus;
   supply means for suppling a print signal corresponding to 1/n of said N printing elements of said printhead, based on the print signal inputted by said input means;
   selection means for selecting the printing elements from said N printing elements of said printhead to be used for printing using the print signal supplied by said supply means;
   instruction means for instructing to drive said printing elements selected by said selection means; and
   repetitive control means for repeating supplying of the print signal by said supply means, selection by said selection means and instruction by said instruction means n times.

9. The printing apparatus according to claim 8, wherein said printhead is an ink-jet printhead which performs printing by discharging ink.

10. The printing apparatus according to claim 8, wherein said printhead, having a thermal-energy transducer for generating thermal energy to be provided to ink, discharges the ink utilizing the thermal energy.

11. The printing apparatus according to claim 9, wherein the value of n is "2", and wherein said supply means first supplies an N/2-bit print signal corresponding to odd-numbered printing elements of said N printing elements, and secondly supplies an N/2-bit print signal corresponding to even-numbered printing elements of said N printing elements.

12. The printing apparatus according to claim 11, wherein after said supply means has supplied the N/2-bit print signal corresponding to the odd-numbered printing elements, said selection means outputs a first selection signal to select the odd-numbered printing elements, and after said supply means has supplied the N/2-bit print signal corresponding to the even-numbered printing elements, said selection means outputs a second selection signal to select the even-numbered printing elements.

13. The printhead according to claim 1, wherein said selective drive circuit divides the N printing elements into n groups, each having N/n printing elements, and sequentially drives one of the n groups so as to perform a printing operation.

14. A printing method for a printhead including N printing elements for performing printing based on a print signal, an input terminal for inputting the print signal, a shift register for storing the print signal, inputted through the input terminal, corresponding to N/n printing elements, where n, N and N/n are respectively positive integers and n<N, a plurality of latch circuits for latching the print signal stored in said shift register, wherein each of said plurality of latch circuits latches the print signal corresponding to N/n printing elements, a selecting circuit for selecting a latch circuit which is used for latching the print signal stored in said shift register from said plurality of latch circuits and a selective drive circuit for selectively driving N/n printing elements of the N printing elements, based on the print signal latched by said latch circuit selecting circuit, said method comprising:

an output step of outputting the print signal, corresponding to N/n printing elements of said N printing elements, to said printhead;

a storage step of storing the print signal outputted in said output step into said shift register;

a selection step of selecting the printing elements, from said N printing elements to be used for printing, using the print signal outputted in said output step;

an instruction step of instructing to drive the printing elements selected in said selection step; and a repetition step of repeating outputting in said output step, storing in said storage step, and instruction in said instruction step n times.

15. The printing method according to claim 14, wherein the printhead is an ink-jet printhead which performs printing by discharging ink.

16. The printing method according to claim 14, wherein the printhead, having a thermal-energy transducer for generating thermal energy to be provided to ink, discharges the ink utilizing the thermal energy.

17. A printhead having N printing elements for performing printing based on a print signal, comprising:

an input terminal for inputting the print signal;

a shift register for storing the print signal, inputted through said input terminal, corresponding to N/n printing elements, where n, N and N/n are respectively positive integers and n<N;

a selective drive circuit for dividing the N printing elements into n groups, each having N/n printing elements, and selectively driving one of the n groups; and a generation circuit for generating a selection signal used for selectively driving one of the n groups, wherein said selective drive circuit selects one of the n groups, based on the selection signal generated by said generation circuit.

18. The printhead according to claim 19, wherein the value of n is "8".

19. A printing apparatus using the printhead in claim 17, comprising:

input means for inputting a print signal from outside of the apparatus; and instruction generating means for sending a first instruction signal to start input of the print signal into said shift register, and a second instruction signal to stop the input of the print signal into said shift register, to said printhead.

20. The printing apparatus according to claim 19, wherein the value of n is "8".

21. The printing apparatus according to claim 19, further comprising control means for supplying the print signal corresponding to the N/n printing elements to the printhead after the first instruction signal has been sent, and subsequently supplying a control signal so as to cause said generation circuit to generate the selection signal after the second instruction signal has been sent.

22. The printing apparatus according to claim 21, wherein, after said control means has supplied the print signal corresponding to N/n printing elements and the control signal n times, a print operation for the N printing elements is completed.

23. The printing apparatus according to claim 21, wherein the control signal is supplied to said printhead through said input terminal of said printhead.

24. The printhead according to claim 17, wherein, when an input of the print signal to said shift register is suppressed, said generation circuit generates the selection signal, based on the print signal inputted through said input terminal.

25. A printing method for a printhead including N printing elements for performing printing based on a print signal; an input terminal for inputting the print signal; a shift register for storing the print signal, inputted through the input terminal, corresponding to N/n printing elements, where n, N and N/n are respectively positive integers and n<N; a selective drive circuit for dividing the N printing elements into n groups, each having N/n printing elements, and selectively driving one of the n groups; and a generation circuit for generating a selection signal used for selectively driving one of the n groups, wherein said selective drive circuit selects one of the n groups based on the selection signal generated by the generation circuit, said method comprising:

an output step of outputting the print signal, corresponding to N/n printing elements of the N printing elements, to the printhead;

a storage step of storing the print signal outputted in said output step into the shift register;

a selection step of selecting the printing elements, from the N printing elements to be used for printing, using the print signal outputted in said output step;

an instruction step of instructing to drive the printing elements selected in said selection step; and a repetition step of repeating outputting in said output step, storing in said storage step, and instruction in said instruction step n times.

26. The printing method according to claim 25, wherein said selection step selects the printing elements by outputting a control signal, used for determining the printing elements to be selected, to the printhead, and said selection step sequentially selects one of the n groups according to the repetition in said repetition step.

27. The printing method according to claim 25, wherein the printhead is an ink-jet printhead which performs printing by discharging ink.

28. The printing method according to claim 25, wherein the printhead, having a thermal-energy transducer for generating thermal energy to be provided to ink, discharges the ink utilizing the thermal energy.

* * * * *

UNITED STATES PATENT AND TRADEMARK OFFICE
CERTIFICATE OF CORRECTION

PATENT NO. : 5,877,784          Page 1 of 2
DATED      : March 2, 1999
INVENTOR(S): MARU ET AL.

It is certified that error appears in the above-identified patent and that said Letters Patent is hereby corrected as shown below:

Title page, item
[57] ABSTRACT:
    Line 10, "information information." should read --information.--.

COLUMN 1:
    Line 27, "supply" should read --to supply--.

COLUMN 2:
    Line 54, "the-parts" should read --the parts--.

COLUMN 3:
    Lines 55 and 56 should be merged into one line.

COLUMN 4:
    Line 5, "printer" should read --printing--.
    Line 28, "4A-4E" should read --4A-4E comprise--.
    Line 45, "example" should read --example of--.

COLUMN 9:
    Line 10, "the" (first occurrence) should be deleted.
    Line 28, "an d" should read --and--.

UNITED STATES PATENT AND TRADEMARK OFFICE
CERTIFICATE OF CORRECTION

| | | |
|---|---|---|
| PATENT NO. : | 5,877,784 | Page 2 of 2 |
| DATED : | March 2, 1999 | |
| INVENTOR(S) : | MARU ET AL. | |

It is certified that error appears in the above-identified patent and that said Letters Patent is hereby corrected as shown below:

Line 43, "the" (second occurrence) should be deleted.
    Line 53, "of" should read --of the--.

COLUMN 12:
    Line 31, "suppling" should read --supplying--.

COLUMN 13:
    Line 59, "claim 19," should read --claim 17,--.

Signed and Sealed this

Thirtieth Day of November, 1999

Attest:

Q. TODD DICKINSON

*Attesting Officer*      *Acting Commissioner of Patents and Trademarks*